(12) United States Patent
Karimelahi et al.

(10) Patent No.: US 11,428,963 B2
(45) Date of Patent: Aug. 30, 2022

(54) METHODS TO IMPROVE MODULATION EFFICIENCY IN SILICON OPTICAL MODULATOR

(71) Applicant: MARVELL ASIA PTE, LTD., Singapore (SG)

(72) Inventors: Samira Karimelahi, San Jose, CA (US); Masaki Kato, San Jose, CA (US)

(73) Assignee: MARVELL ASIA PTE LTD., Singapore (SG)

( * ) Notice: Subject to any disclaimer, the term of this patent is extended or adjusted under 35 U.S.C. 154(b) by 0 days.

(21) Appl. No.: 17/119,429

(22) Filed: Dec. 11, 2020

(65) Prior Publication Data

US 2022/0187635 A1 Jun. 16, 2022

(51) Int. Cl.
*G02F 1/025* (2006.01)
*G02F 1/015* (2006.01)

(52) U.S. Cl.
CPC ............ *G02F 1/025* (2013.01); *G02F 1/0152* (2021.01)

(58) Field of Classification Search
CPC .............................. G02F 1/025; G02F 1/0152
See application file for complete search history.

(56) References Cited

U.S. PATENT DOCUMENTS

| | | | |
|---|---|---|---|
| 6,298,177 B1 | 10/2001 | House | |
| 9,939,666 B2 * | 4/2018 | Chen | ...................... G02B 6/134 |
| 10,627,655 B2 * | 4/2020 | Huang | .................... G02F 1/025 |
| 10,684,527 B2 * | 6/2020 | Watts | .................... G02B 6/1223 |
| 10,866,440 B1 | 12/2020 | Cho et al. | |
| 2006/0008223 A1 | 1/2006 | Gunn et al. | |
| 2008/0159680 A1 | 7/2008 | Gill | |
| 2016/0202503 A1 | 7/2016 | Chen | |
| 2016/0299363 A1 * | 10/2016 | Wei | .......................... G02F 1/025 |
| 2017/0075148 A1 * | 3/2017 | Baudot | .................... G02F 1/025 |
| 2020/0124883 A1 | 4/2020 | Delisle-Simard et al. | |
| 2022/0026747 A1 | 1/2022 | Chen | |

* cited by examiner

*Primary Examiner* — Ellen E Kim

(57) ABSTRACT

A method for forming a silicon optical modulator with improved modulation efficiency. the method includes providing a silicon layer in a SOI substrate and forming a waveguide in the silicon layer with a rib structure respectively joining with a first slab region on one side and a second slab region on opposite side with corresponding slab thicknesses smaller than the rib structure. The method additionally includes forming multiple etched sections in each of the first slab region and the second slab regions with decreasing etching depths for sections further away from the rib structure. Furthermore, the method includes forming a PN junction in the rib structure with a moderate P/N doping level. Moreover, the method includes doping the multiple etched sections in the first/second slab region respectively with P-type/N-type impurity at increasing doping levels sequentially for sections further away from the rib structure.

11 Claims, 7 Drawing Sheets

METHODS TO IMPROVE MODULATION EFFICIENCY IN SILICON OPTICAL MODULATOR

CROSS-REFERENCE TO RELATED APPLICATIONS

N/A

BACKGROUND OF THE INVENTION

The present invention relates to optical communication techniques. More particularly, the present invention provides a silicon optical modulator, methods for forming the silicon optical modulator with improved modulation efficiency.

Over the last few decades, the use of communication networks exploded. In the early days Internet, popular applications were limited to emails, bulletin board, and mostly informational and text-based web page surfing, and the amount of data transferred was usually relatively small. Today, Internet, social network, mobile applications, and cloud computing demand a huge amount of bandwidth for transferring large amount of data such as photo, video, music, and other multimedia files. Most of traffic is coming from the consumer usage. For example, a social network like Facebook processes more than 500 TB of data daily. With such high demands on data and data transfer with high speed link not only between users and data centers but also within data centers, existing data communication systems need to be improved to address these needs.

Optical interconnect has shown improvement over electrical link. High data rates over 40-Gbit/s or 100-Gbit/s signal transmission through single-mode fiber is a target for the next generation of fiber-optic communication networks in which plenty of applications involve high speed silicon photonics devices. The electro-optical modulator is one of the main components of the optical link. Due to the dense integration possibility and CMOS fabrication compatibility, silicon photonics is the best option to realize fast and miniaturized optical interconnect solution. In order to make the high capacity of the optical communication links, the design of the silicon-photonics-based optical modulator needs to be optimized to improve modulation efficiency, minimize optical loss, and widened bandwidth.

BRIEF SUMMARY OF THE INVENTION

The present invention relates to optical telecommunication techniques. More particularly, the present invention provides methods for forming silicon optical modulator with rib waveguide structure with optimized doping scheme and multi-etched slab for improving modulation performance. The silicon optical modulator with multi-etched slab is provided with improved modulation efficiency and modulator bandwidth, applicable in various high-speed optical communication links, though other applications are possible.

In an embodiment, the present invention provides a method for forming a silicon optical modulator with improved modulation efficiency. The method includes a step of providing a silicon layer in a SOI substrate. The method further includes a step of forming a waveguide in the silicon layer with a rib structure respectively joining with a first slab region on one side and a second slab region on opposite side with corresponding slab thicknesses smaller than the rib structure. Additionally, the method includes a step of forming multiple etched sections in each of the first slab region and the second slab regions with decreasing etching depths for sections further away from the rib structure. Furthermore, the method includes a step of forming a PN junction in the rib structure with a moderate P/N doping level. Moreover, the method includes a step of doping the multiple etched sections in the first/second slab region respectively with P-type/N-type impurity at increasing doping levels sequentially for sections further away from the rib structure.

Optionally, the step of forming the multiple etched sections includes patterning each of the first slab region and the second slab region to define different section lengths for multiple sections from a first section next to the rib structure to a last section with respective distances away from the rib structure and etching the multiple sections with decreasing etching depths sequentially from the first section to the last section.

Optionally, the step of forming the multiple etched sections further includes forming the first section with a thinnest thickness next to the rib structure to enhance optical mode confinement effect.

Optionally, the step of forming the multiple etched sections further includes forming a second section up to the last section with increasing thicknesses to compensate series resistance in the first slab region or the second slab region.

Optionally, the step of forming the PN junction in the rib structure with a moderate P/N doping level includes forming a P-type region interfaced with a N-type region in a reduced portion of the rib structure, while forming a first edge part of the rib structure in an intermediate $P_{+1}$ doping level higher than the moderate P doping level joined with the P-type region and a second edge part of the rib structure in an intermediate $N_{+1}$ doping level higher than the moderate N doping level joined with the N-type region.

Optionally, the step of forming the PN junction includes forming a $P_+/N_+$ junction with an interface directly between the first edge part and the second edge part as a width of the reduced portion is reduced to zero.

Optionally, the step of doping the multiple etched sections in the first/second slab region includes implanting P/N-type ionic impurity with increasing dosages sequentially from the first section with a lowest intermediate $P_+/N_+$ doping level, the second section with a higher intermediate $P_+/N_+$ doping level, to the last section with a highest intermediate $P_+/N_+$ doping level. The section lengths, thicknesses, distances from the rib structure, and respective doping levels are optimized to minimize series resistance and optical loss through the first slab region, rib structure, and the second slab region.

In another aspect, the present disclosure provides a method for forming a silicon optical modulator with improved modulation efficiency. The method includes a step of providing a silicon layer in a SOI substrate. The method further includes a step of forming a waveguide in the silicon layer with a rib structure respectively joining with a first slab region on one side and a second slab region on opposite side. Additionally, the method includes a step of doping the first slab region to an intermediate $P_+$ doping level and doping the second slab region to an intermediate $N_+$ doping level. Furthermore, the method includes a step of expanding the $P_+$ doping level into a first edge part of the rib structure from the first slab region and expanding the $N_+$ doping level into a second edge part of the rib structure from the second slab region to leave a reduced portion of the rib structure between the first edge part and the second edge part. Moreover, the method includes a step of forming a PN junction with an interface between a moderate P part and a moderate N part in the reduced portion of the rib structure.

Optionally, the step of forming the waveguide includes forming the first slab region and the second slab region respectively with nominal slab thicknesses smaller than that of the rib structure for confining optical mode of a light wave through the waveguide substantially within the rib structure.

Optionally, the step of doping the first slab region to the intermediate $P_+$ doping level includes forming a first end region in heavy $P_{++}$ doping level joined with the first slab region and doping the second slab region to the intermediate $N_+$ doping level comprises forming a second end region in heavy $N_{++}$ doping level joined with the second slab region.

Optionally, the intermediate $P_+$ or $N_+$ doping level is set to be above the moderate P or N doping level of about $1 \times 10^{17}$ cm$^{-3}$ and below the heavy $P_{++}$ or $N_{++}$ doping level of about $1 \times 10^{20}$ cm$^{-3}$.

Optionally, the step of expanding the $P_+$ doping level into a first edge part of the rib structure and expanding the $N_+$ doping level into a second edge part of the rib structure include forming an interface directly between the first edge part in $P_+$ doping level and the second edge part in $N_+$ doping level as the reduced portion has its width being reduced to zero.

In yet another aspect, the present disclosure provides a silicon optical modulator. The silicon optical modulator includes a silicon waveguide with a rib structure in cross section connected to a first slab region on one side and a second slab region on opposite side respectively with nominal slab thicknesses smaller than the rib structure. The silicon optical modulator further includes an intermediate high $P_+$ doping level in the first slab region plus a first edge part of the rib structure corresponding to an intermediate high $N_+$ doping level in the second slab region plus a second edge part of the rib structure. Additionally, the silicon optical modulator includes a PN junction formed in a reduced portion of the rib structure with a P-type part in moderate P doping level interfaced with a N-type part in moderate N doping level. Furthermore, the P-type part is joined with the first edge part and the N-type part is joined with the second edge part in the rib structure; the first slab region is ended with a first end region in heavy $P_{++}$ doping level and the second slab region is ended with a second end region in heavy $N_{++}$ doping level.

Optionally, the PN junction has a width ranged from a reduced width from a total width of the rib structure down to zero.

Optionally, the first slab region includes multiple etched sections with decreasing etching depths sequentially from a first section having a largest etching depth or a thinnest thickness next to the first edge part of the rib structure to a last section having no etching depth or the nominal slab thickness joined with the first end region.

Optionally, the second slab region includes multiple etched sections with decreasing etching depths sequentially from a first section having a largest etching depth or a thinnest thickness next to the second edge part of the rib structure to a last section having no etching depth or the nominal slab thickness joined with the second end region.

Optionally, the multiple etched sections in the first slab region includes multiple doping levels increasing sequentially from a first doping level in the first section equal to or greater than the intermediate $P_+$ doping level to a last doping level in the last section less than the heavy $P_{++}$ doping level.

Optionally, the multiple etched sections in the second slab region comprises multiple doping levels increasing sequentially from a first doping level in the first section equal to or greater than the intermediate $N_+$ doping level to a last doping level in the last section less than the heavy $N_{++}$ doping level.

The present invention achieves these benefits and others in the context of known silicon photonics technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
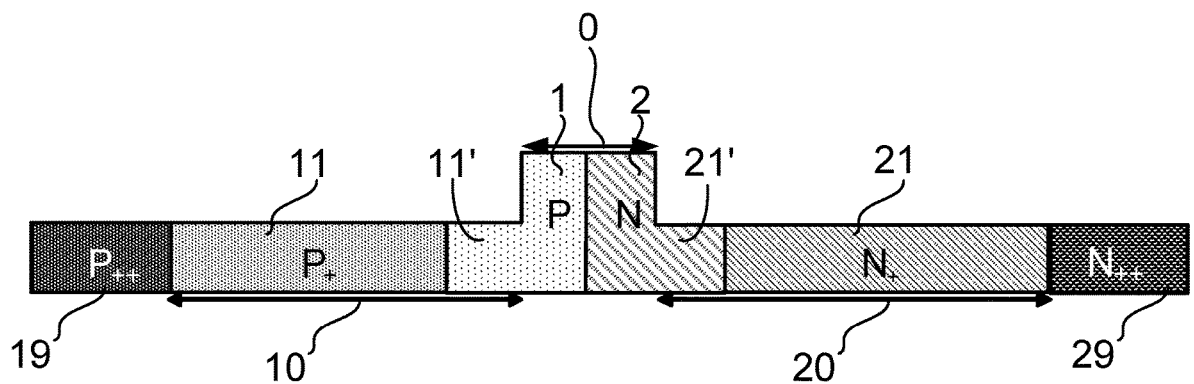
FIG. 1 is a schematic cross-sectional diagram of a silicon optical modulator in prior art.

The present invention relates to optical telecommunication techniques. More particularly, the present invention provides methods for forming silicon optical modulator with rib waveguide structure with optimized doping scheme and multi-etched slab for improving modulation performance. The silicon optical modulator with multi-etched slab is provided with improved modulation efficiency and modulator bandwidth, applicable in various high-speed optical communication links, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, rib, slab, edge, and section have been used for convenience purposes only and are not intended to imply any particular fixed direction. Instead, they are used to reflect relative locations and/or directions between various portions of an object.

The main key factors defining the optical modulator performance are modulation efficiency, optical loss, and bandwidth. These parameters will determine the power consumption of the electro-optical transmitter. For silicon based optical modulator, plasma dispersion (free carrier) effect may be used to do the job as electro-refraction occurs though third order nonlinear dependency of the refractive index on electric field (Kerr effect) is weak in silicon. In free carrier effect, varying an applied voltage to the electro-optical modulator changes the carrier density and varies the absorption and refractive index. The changes in the refractive index inside the waveguide can be translated to phase and intensity modulation of the incoming light. The common optical modulator configurations are interferometers such as Mach-Zehnder modulator or resonance-based devices like ring modulators, often used in the optical communication link.

FIG. 1 is a schematic cross-sectional diagram of a silicon optical modulator in prior art. As shown, the silicon optical modulator is provided as a silicon waveguide. The silicon waveguide can be formed in a silicon layer of a silicon-on-insulator (SOI) substrate. The silicon waveguide or the optical modulator based on thereof can have a finite length, which is not shown in this cross-sectional diagram, to define a phase associated with a branch of an interferometer or a ring modulator. In the cross-sectional view, the silicon optical modulator has a rib structure 0 with a first slab region 10 and a second slab region 20 on either side of the rib structure. The first slab region 10 is ended at a first end region 19 and the second slab region 20 is ended at a second slab region 29. In particular, the silicon waveguide includes a PN junction formed in the rib structure 0 by doping about half of the rib structure to P-type impurity to form a P-type part 1 and doping another half of the rib structure to N-type impurity to form a N-type part 2. Optionally, the P-type part 1 may include a small section 11' of the first slab region 10 and the N-type part 2 may include a small section 21' of the second slab region 20. The rest part of the first slab region 10 is doped with an intermediate $P_+$ level and the rest part of the second slab region 20 is doped with an intermediate $N_+$ level. Further, the first end region 19 is doped heavily with P-type impurity to form a $P_{++}$ region and the second end region 29 is doped heavily with N-type impurity to form a $N_{++}$ region. Optionally, the $P_{++}$ region and the $N_{++}$ region are respectively used for forming P and N electrodes for the PN junction to serve its modulation operation. The intermediate $P_+/N_+$ level in the first/second slab region is higher than the moderate P/N level of the PN junction.

Figure 2:
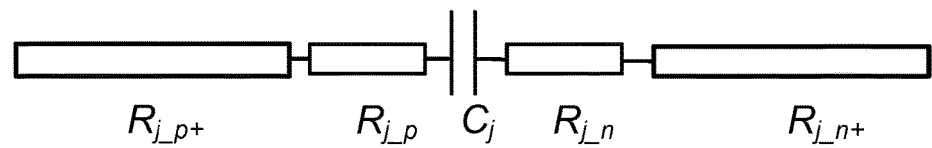
FIG. 2 is a schematic diagram of an equivalent circuit of the silicon optical modulator in FIG. 1.

The PN junction provides a mechanism for the charged carriers to be injected into the silicon waveguide to alter refractive index depending on changing electric field induced by change of electrical signals (0s or 1s supplied by a driver). Along the cross-section of the silicon waveguide, the charged carries being subjected to an electric field that can be equivalently represented by a circuit, as shown in FIG. 2. At least partially, the circuit is given by a serial connection of a first resistor $R_{j\_p+}$, a second resistor $R_{j\_p}$, a capacitor $C_j$, a third resistor $R_{j\_n}$, and a fourth resistor $R_{j\_n+}$. As shown, the first resistor $R_{j\_p+}$ represents a series resistance of the heavy doped $P_{++}$ region 19. The second resistor $R_{j\_p}$ represents a series resistance of both the intermediate doped ($P_+$) portion 11 of the first slap region 10 and the moderate doped P-type part 1 including a small portion 11' of the first slab region 10. The capacitor $C_j$ represents the PN junction. The third resistor $R_{j\_n}$ represents a series resistance of both the moderate doped N-type part 2 including a small portion 21' of the second slab region and intermediate doped ($N_+$) major portion 21 of the second slab region 20. Here, the major portion 11 of the first slab region 10 is just a single section that is doped at the intermediate $P_+$ level between the PN junction and the P-type electrode formed with the $P_{++}$ region 19, and the major portion 21 of the second slab region 20 is a single section that is doped at the intermediate $N_+$ level between the N-type part 2 of the PN junction and the N-type electrode formed with the $N_{++}$ region 29. The intermediate doping $P_+/N_+$ level inside the first/second slab region of the silicon waveguide help to reduce the series resistance and improve modulation bandwidth. However, the silicon optical modulator with a single section of the intermediate doping level in the slab region remains to be improved.

Accordingly, the present disclosure provides, inter alia, an optical modulator based on silicon waveguide in a rib structure and multi-etched slab regions, and methods for improving modulation efficiency that substantially obviate one or more of the problems due to limitations and disadvantages of the related art.

Figure 3:
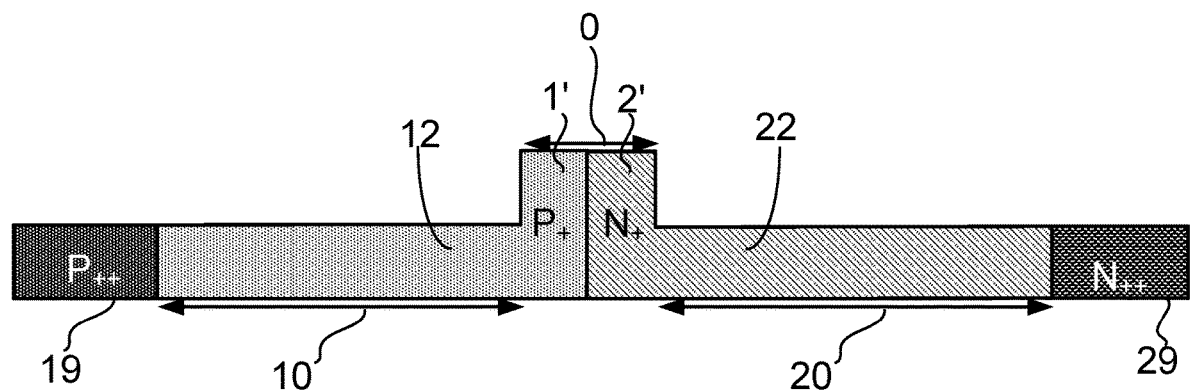
FIG. 3 is a schematic cross-sectional diagram of a silicon optical modulator according to some embodiments of the present disclosure.

In one aspect, the present disclosure provides a silicon optical modulator improve the modulation performance by optimizing the doping of a rib waveguide with possibility of adding no changes to the readily-available foundry doping conditions for high-speed communication network. FIG. 3 is a schematic cross-sectional diagram of a silicon optical modulator according to some embodiments of the present disclosure. This diagram is merely an example, which should not unduly limit the scope of the claims. One of ordinary skill in the art would recognize many variations, alternatives, and modifications. Referring to FIG. 3, the silicon optical modulator is based on a silicon waveguide formed in a silicon layer of a silicon-on-insulator substrate. In the cross-sectional view, the silicon waveguide includes a rib structure 0 at center to join with a first slab region 10 on one side and a second slab region 20 on another side in horizontal direction. The first slab region 10 is ended with a first end region 19 in heavy doping $P_{++}$ level and the second slab region 20 is ended with a second end region 29 in heavy doping $N_{++}$ level. In the embodiment, the first slab region 10 is doped to an intermediate $P_+$ level which is expanded into a first edge part 1' of the rib structure 0 and the second slab region 20 is doped to an intermediate $N_+$ level which is expanded into a second edge part 2' of the rib structure 0. Optionally, the first edge part 1' and the second edge part 2' of rib structure 0 may actually join together in the rib structure. Unlike the prior art silicon optical modulator in FIG. 1 with the PN junction in moderate doping level in either P-type part 1 or N-type part 2, the doping level across the PN junction now may be in an higher intermediate $P_+$ or $N_+$ doping level.

Figure 4:
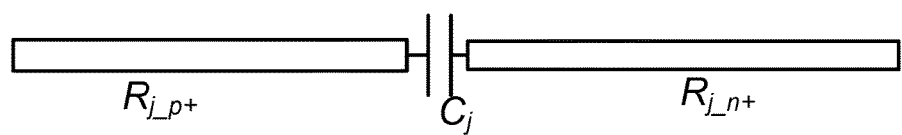
FIG. 4 is a schematic diagram of an equivalent circuit of the silicon optical modulator in FIG. 3 according to some embodiments of the present disclosure.

Optionally, the PN junction doping level in the conventional silicon optical modulator of FIG. 1 may be around $1 \times 10^{17}$ cm$^{-3}$. While, the PN junction doping level in the silicon optical modulator of FIG. 3 may be increased to $1 \times 10^{18}$ cm$^{-3}$ to $1 \times 10^{19}$ cm$^{-3}$. To insure good ohmic contact between silicon and metal, the doping concentration of the first/second end regions 19/29 is ~$1.0 \times 10^{20}$ cm$^{-3}$ for both dopant types. FIG. 4 shows a schematic diagram of an equivalent circuit of the silicon optical modulator in FIG. 3 according to some embodiments of the present disclosure. A combined first slab/rib region gives a single resistor $R_{j\_p+}$ and a combined second slab/rib region gives a resistor $R_{j\_n+}$. Higher doping level suggests a lower equivalent series resistance for the silicon optical modulator. Thus, the single $R_{j\_p+}$ here in FIG. 4 is smaller than $R_{j\_p+}+R_{j\_p}$ in FIG. 2. A higher doping level can introduce greater change of the carrier concentration in the PN junction interface, which contributes to a more effective index modulation, i.e., higher modulation efficiency, as the increasing carrier concentration can cause a large phase shift with a small voltage variation.

Figure 5:
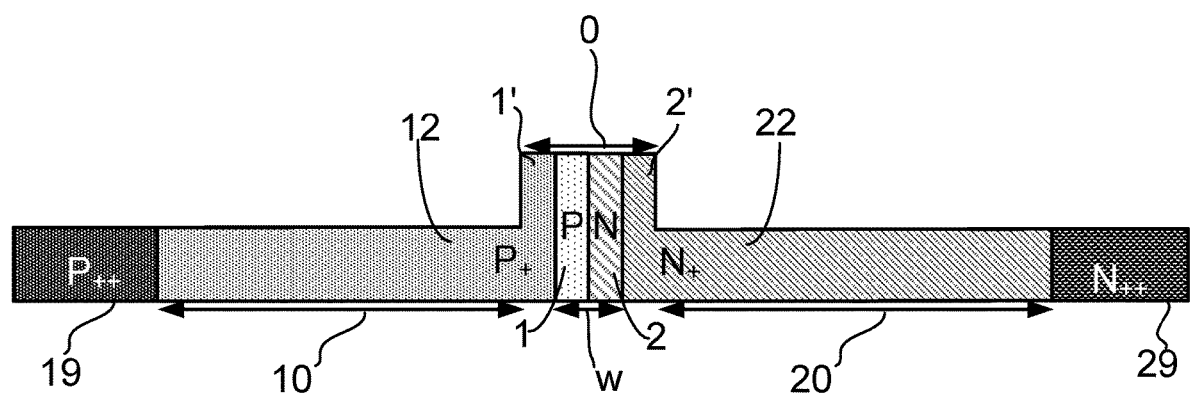
FIG. 5 is a schematic cross-sectional diagram of a silicon optical modulator according to some embodiments of the present disclosure.
Figure 6:
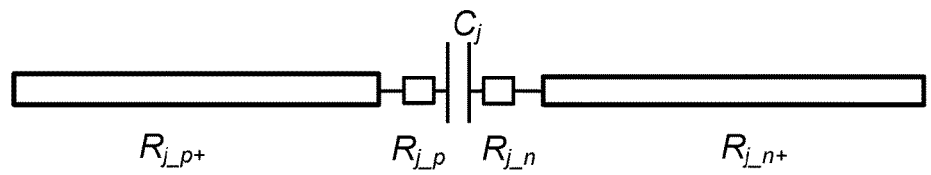
FIG. 6 is a schematic diagram of an equivalent circuit of the silicon optical modulator in FIG. 5 according to some embodiments of the present disclosure.

In an embodiment of the silicon optical modulator, the higher intermediate $P_+$ doping level in the first slab region 10 is configured to be partially expanded into a first edge part 1' of the rib structure 0 and the higher intermediate $N_+$ doping level in the second slab region 20 is configured to be partially expanded into a second edge part 2' of the rib structure 0 from opposite side, while leaving a gap between boundary of the first edge part 1' ($P_+$) and boundary of the second edge part 2' ($N_+$) of a width w near a central region of the rib structure 0. FIG. 5 shows a schematic cross-sectional diagram of the silicon optical modulator according to the of the present disclosure. As shown, a PN junction between a P-type part 1 with a moderate P doping level and a N-type part 2 with a moderate N doping level remains to be in the gap between the boundary of the first edge part 1' and the boundary of the second edge part 2'. The first edge part 1' in $P_+$ doping level joins with the P-type part 1 and the second edge part 2' in $N_+$ doping level joins with the N-type part 2. FIG. 6 shows an equivalent circuit of the silicon optical modulator of FIG. 5 according to the embodiment of the present disclosure. The first edge part 1' plus the entire first slab region in $P_+$ doping level forms a $P_+$ region 12 which is represented by a resistor $R_{j\_p+}$ while the narrowed P-type part 1 is represented by a resistor $R_{j\_p}$ in the equivalent circuit. Additionally, the second edge part 2' plus the entire second slab region in $N_+$ doping level forms a $N_+$ region 22 which is represented by a resistor $R_{j\_n+}$ while the narrowed N-type part 2 is represented by a resistor $R_{j\_n}$ in the equivalent circuit. The gap w between the part 1' ($P_+$) and the part 2' ($N_+$), and the offset from the center of the rib waveguide can be selected in such a way to optimize modulation efficiency while does not impact much on the bandwidth and optical loss. Optionally, the gap w can be reduced to zero, which makes the embodiment of FIG. 5 to be converged to the embodiment of FIG. 3. The Modulation efficiency improvement method suggested by this invention enables us to decrease the size of the optical modulator such as Mach-Zehnder (MZ) modulator. Possibility of shorter modulator not only save the chip real state but also provide compensation on the modulator bandwidth and can improve the bandwidth and reduce the overall modulator loss.

Figure 7:
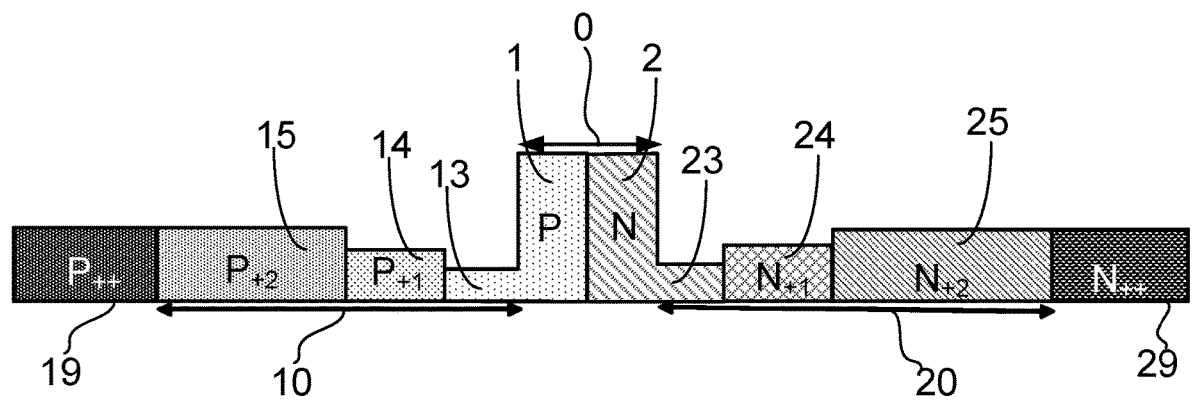
FIG. 7 is a schematic cross-sectional diagram of a silicon optical modulator according to some embodiments of the present disclosure.

In an alternative embodiment, the present disclosure provides a silicon optical modulator including multi-etched sections in both the first slab region and the second slab region at each side of the rib structure. FIG. 7 is a schematic cross-sectional diagram of such a silicon optical modulator with multi-etched sections according to some embodiments of the present disclosure. As shown, the rib structure 0 is formed with a PN junction with the P-type part 1 interfaced with the N-type part 2 in moderate P/N doping level. The P-type part 1 is joined with a small section 13 of the first slab region 10 also doped in moderate P doping level. The N-type part 2 is joined with a small section 23 of the second slab region 20 also doped in moderate N doping level. Unlike conventional silicon modulator, the section 13 or the section 23 is etched down with reduced thickness comparing to nominal thickness of the first slab region 10 or the second slab region 20. Further in remain portion of the first slab region 10, one or more sections can be formed in a configuration with decreasing etched depth or increasing thickness for sections further away from the rib structure. For example, a second section 14 with a slightly higher thickness than that of the first section 13 is formed next to the first section 13. Further, a third section 15 with a slightly higher thickness than that of the second section 14 is formed next to the second section 14. Optionally, the third section 15 as referred in FIG. 7, or in general, a last section in the first slab region 10, is not etched so that it has a same nominal thickness of the first slab region 10.

Optionally, the multiple etched sections (e.g., 14, 15) in the first slab region 10 can be doped with P-type impurity at just one level at intermediate $P_+$ doping level. Optionally, the multiple etched sections can be doped with P-type impurity at respectively increasing doping concentration for sections further away from the rib structure. For example, the second section 14, which is further away than the first section 13 at P doping level, is doped at $P_{+1}$ doping level and the third section 15, which is further away than the second section 14, is doped at $P_{+2}$ doping level. Here, the doping levels starting from the first section 13 to a last section of the first slab region 10 are sequentially set in the following relationship: $P<P_{+1}<P_{+2}<\ldots<P_{++}$. $P_{++}$ is the doping level of the first end region 19, which is doped heavily for forming electric contact of a first electrode of the silicon optical modulator. By increasing the doping level in the slab region gradually as moving further away from the rib structure, the optical loss increase is insignificant. Because light intensity is getting lower moving away from the rib region where optical mode is mostly confined, and optical mode will not be affected by free carrier absorption.

On another side of the rib structure, multiple etched sections are formed in the remaining portion of the second slab region 20 in a configuration with decreasing etched depth or increasing thickness for sections further away from the rib structure. For example, a second section 24 with a slightly higher thickness than that of the first section 23 is formed next to the first section 23. Further, a third section 25 with a slightly higher thickness than that of the second section 24 is formed next to the second section 24. Optionally, the third section 25 as referred in FIG. 7, or in general, a last section in the second slab region 20, is not etched so that it has a same nominal thickness of the first slab region 20.

Optionally, the multiple etched sections (e.g., 24, 25) in the second slab region 20 can be doped with N-type impurity at just one level at intermediate $N_+$ doping level. Optionally, the multiple etched sections can be doped with N-type impurity at respectively increasing doping concentration for sections further away from the rib structure. For example, the second section 24, which is further away than the first section 23 at N doping level, is doped at $N_{+1}$ doping level and the third section 25, which is further away than the second section 24, is doped at $N_{+2}$ doping level. Here, the doping levels starting from the first section 23 to a last section of the first slab region 20 are sequentially set in the following relationship: $N<N_{+1}<N_{+2}<\ldots<N_{++}$. $N_{++}$ is the doping level of the second end region 29, which is doped heavily for forming electric contact of a second electrode of the silicon optical modulator. By increasing the doping level in the slab region gradually as moving further away from the rib structure, the optical loss increase is insignificant. Because light intensity is getting lower moving away from the rib region where optical mode is mostly confined, and optical mode will not be affected by free carrier absorption.

Figure 8:
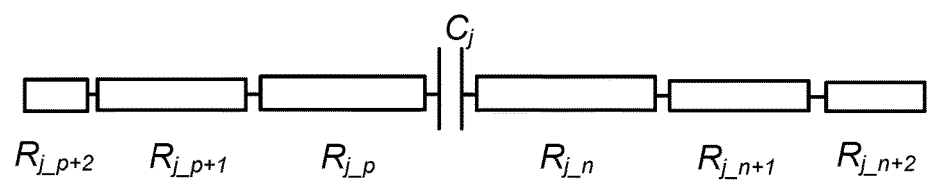
FIG. 8 is a schematic diagram of an equivalent circuit of the silicon optical modulator in FIG. 7 according to some embodiments of the present disclosure.

In the embodiment, with the multi-etched sections formed in the slab regions the electric field confinement of the optical mode can be increased by thinner slab section closer to the rib structure of the waveguide. Increasing confinement leads to lowered optical loss and improved modulation efficiency. As shown in FIG. 8, an equivalent circuit of the silicon optical modulator of FIG. 7 gives a series of resistors and a capacitor to represent different sections of the slab region or rib structure and the PN junction interface. For example, resistor $R_{j\_p}$ represents a series resistance of the first edge part 1' of the rib structure 0 plus the first section 13 of the first slab region 10. $R_{j\_p+1}$ represents a series resistance of the second section 14 of the first slab region 10. $R_{j\_p+2}$ represents a series resistance of the third section 15 of the first slab region 10. Capacitor Cj represents the PN junction. Resistor $R_{j\_n}$ represents a series resistance of the second edge part 2' of the rib structure 0 plus the first section 13 of the first slab region 10. $R_{j\_p+1}$ represents a series resistance of the second section 14 of the first slab region 10. $R_{j\_p+2}$ represents a series resistance of the third section 15 of the first slab region 10. For the multi-etched sections in the slab regions, less etched depth leads to larger thickness or reduced series resistance. As suggested in FIG. 8, having multi-etched depths at different sections of the first/second slab region proposed in this invention provides increasing section thickness with distances further away from the rib structure to compensate for series resistance and optimize the bandwidth. Optionally, the multi-etched sections in the slab regions can have two or more sections with different etched depths and lengths and maybe symmetric or asymmetric on either side of the rib structure. The etched depth and length of each etched section, its distance to the rib structure, and its doping level should be all taken into consideration for getting the silicon optical modulator optimized with a minimum series resistance without increasing optical loss.

Figure 9:
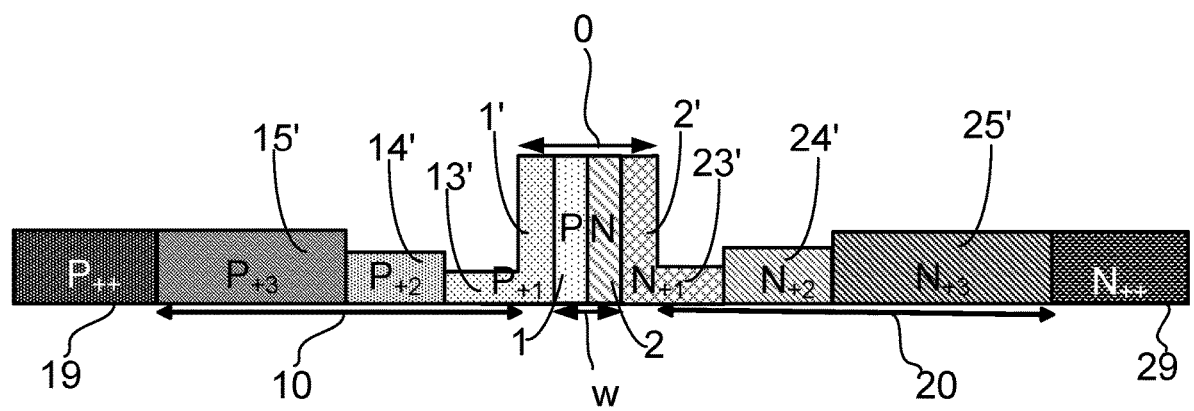
FIG. 9 is a schematic cross-sectional diagram of a silicon optical modulator according to an alternative embodiment of the present disclosure.

FIG. 9 is schematic cross-sectional diagram of a silicon optical modulator according to an alternative embodiment of the present disclosure. In the embodiment, the silicon optical modulator includes a rib structure 0 near a center and a slab region 10 or 20 with multi-etched sections jointed on either side of the rib structure 0. A PN junction with a P-type part 1 interfaced with a N-type part 2 in P/N doping level is formed in a reduced width w of the rib structure 0, while a first edge part 1' of one side the rib structure 0 is doped to $P_{+1}>P$ doping level joined with a first etched section 13' in the same $P_{+1}$ doping level in the first slab region 10 and a second edge part 2' of another side of the rib structure 0 is doped to $N_{+1}>N$ doping level joined with a first etched section 23' in the same $N_{+1}$ doping level in the second slab region 20. Further for the remain portion of the first/second slab regions, one or more etched sections are formed with decreasing etched depths or increasing thicknesses for sections with distances further away from the first/second edge part 1'/2'. For example, similar to the embodiment shown in FIG. 7, a second section 14' of the first slab region 10 is formed next to the first section 13', the second section 14' having a smaller etched depth or slightly higher thickness than that of the first section 13'. Optionally, the second section 14' is doped at $P_{+2}$ ($>P_{+1}$) doping level. A third section 15' is formed next to the second section 14', the third section 15' having a smaller etched depth or slightly higher thickness than that of the second section 14'. Optionally, the third section 15' is a last section in the first slab region 10, which has a same nominal thickness of the first slab region 10, joined with a first end region 19 in $P_{++}$ doping level. Optionally, the third section 15' is doped at $P_{+3}$ ($>P_{+2}$) doping level, giving $P_{++}>P_{+3}>P_{+2}>P_{+1}>P$.

On the other side of the rib structure, a second section 24' of the second slab region 20 is formed next to the first section 23', the second section 24' having a smaller etched depth or slightly higher thickness than that of the first section 23'. Optionally, the second section 24' is doped at $N_{+2}$ ($>N_{+1}$) doping level. A third section 25' is formed next to the second section 24', the third section 25' having a smaller etched depth or slightly higher thickness than that of the second section 24'. Optionally, the third section 25' is a last section in the second slab region 20, which has a same nominal thickness of the second slab region 20, joined with a second end region 29 in $N_{++}$ doping level. Optionally, the third section 25' is doped at $N_{+3}$ doping level, giving $N_{++}>N_{+3}>N_{+2}>N_{+1}>N$.

Figure 10:
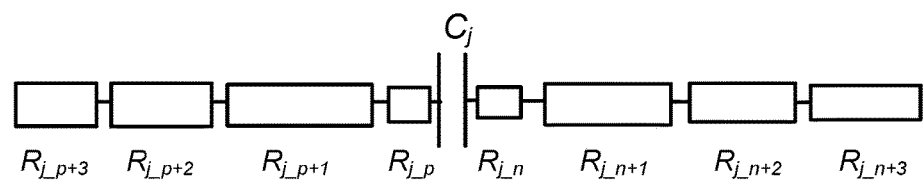
FIG. 10 is a schematic diagram of an equivalent circuit of the silicon optical modulator in FIG. 9 according to the embodiment of the present disclosure.

FIG. 10 is a schematic diagram of an equivalent circuit of the silicon optical modulator in FIG. 9 according to the embodiment of the present disclosure. Here, each resistor represents one section of the waveguide, either a part of the rib structure 0 or a section of the first/second slab region. For example, the resistor $R_{j\_p}$ represents the P-type part 1. The resistor $R_{j\_p+1}$ represents the part 1' of the rib structure 0 plus a first section 13' of the first slab region 10. Other resistors are respectively used to denote corresponding sections as indicated in FIG. 9. Optionally, the P and N side of the rib structure plus the multi-etches sections in first/second slab regions may or may not be symmetric in terms of the distance from the rib structure, section length, etched depth (or thickness), and doping level. Comparing to conventional slab modulator with single intermediate doping section, the multi-etched/doped slab modulator has advantages on improved modulator bandwidth as its series resistance is reduced and improved modulation efficiency as the reduced slab thickness enhances optical confinement. By optimizing all these parameters including the length and etched depth of each slab section, its distance to the edge of the rib structure, and its doping level, the modulator performance can be improved. Optionally, the silicon optical modulator according to some embodiments of the present disclosure can be implemented in various electro-optical modulator configurations such as Mach-Zehnder (MZ) modulator and ring modulator configured to change the refractive index inside the waveguide to modulate phase and intensity of the light through the waveguide.

Figure 11:
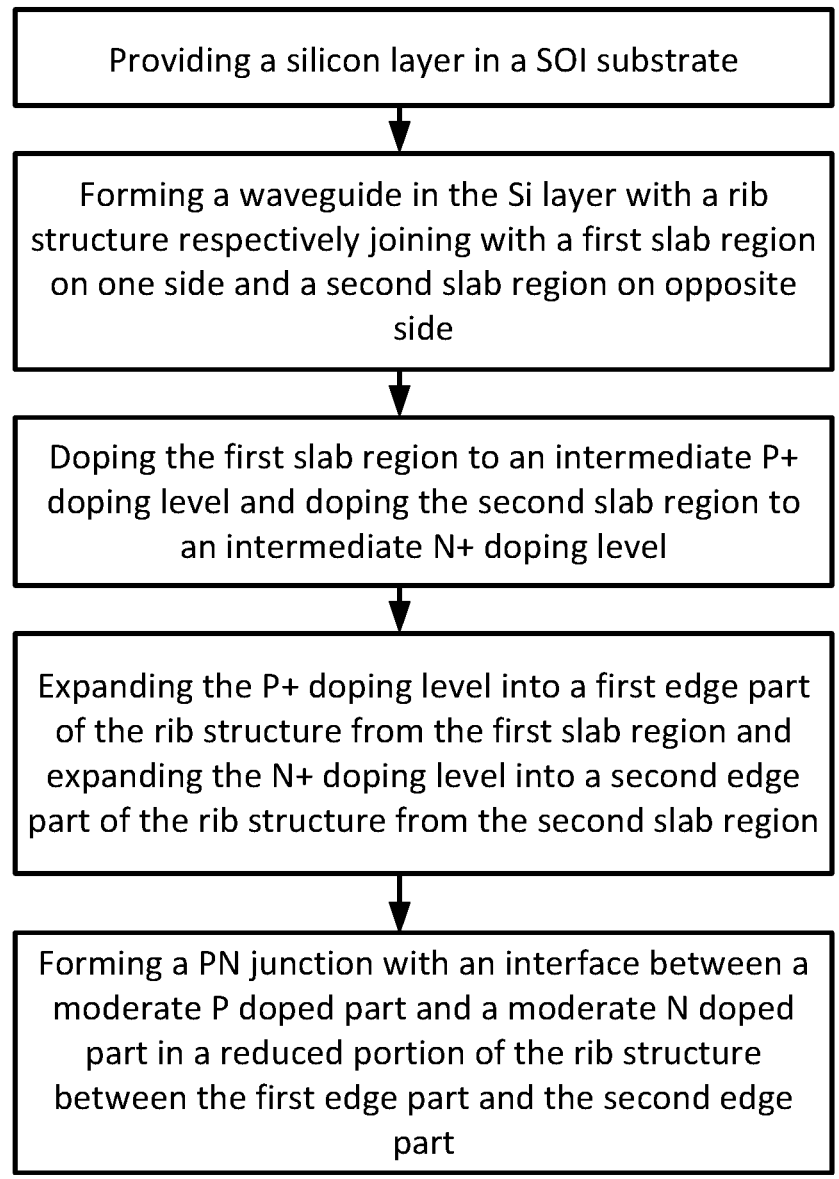
FIG. 11 is a flow chart of a method for improving modulation efficiency of a silicon optical modulator according to an embodiment of the present disclosure.

In an alternative aspect, the present disclosure provides a method for forming a silicon optical modulator with improved modulation efficiency. FIG. 11 shows a flow chart of the method according to an embodiment of the present disclosure. This diagram is merely an example, which should not unduly limit the scope of the claims. One of ordinary skill in the art would recognize many variations, alternatives, and modifications. Referring to FIG. 11, the method includes a step of providing a silicon layer in a silicon-on-insulator (SOI) substrate. SOI substrate is widely used in manufacturing of silicon photonics devices including modulator, combiner, wavelength locker, wavelength tuner, etc. Both MZ modulator and ring modulator can be fabricated based on the silicon layer on SOI substrate.

Referring to FIG. 11, the method also includes a step of forming a waveguide in the silicon layer with a rib structure in cross-section joined with a first slab region on one side and a second slab region on opposite side. Optionally, the rib structure has a flat top with a length in the cross-section ended with a first edge joining the first slab region and a second edge joining the second slab region. Optionally, the rib structure with the finite length between two slab regions with nominal thicknesses smaller than the rib structure provides an optical confinement effect for light waves traveling through it, making less and less optical power in the slab region as it is further away from the first/second edge. Optionally, the first slab region and the second slab region may be in symmetric or asymmetric form in slab thickness or length relative to the rib structure.

Referring to FIG. 11, the method additionally includes a step of doping the first slab region to an intermediate high $P_+$ doping level and doping the second slab region to an intermediate high $N_+$ doping level. The doping process involves patterning and masking to define the first slab region or the second slab region and performing ion-implantation to implant either P-type or N-type ionic impurities into the corresponding first slab region and the second slab region with controlled dosage that leads to the corresponding intermediate $P_+$ or $N_+$ doping level. Optionally, the intermediate $P_+$ or $N_+$ doping level is set to be 1 or 2 order magnitude higher than a moderate doping level at $1 \times 10^{17}$ cm$^{-3}$ which is normally used for forming a PN junction in silicon optical modulator. Optionally, the first slab region is ended to join with a first end region that is doped with P-type impurity in heavily high $P_{++}$ doping level and the second slab region is ended to join with a second end region that is doped with N-type impurity in heavily high $N_{++}$ doping level. Typically, the $P_{++}$ or $N_{++}$ doping level is set to about $1 \times 10^{20}$ cm$^{-3}$. Optionally, the first end region is configured to form a P-side contact electrode with ohmic contact and the second end region is configured to form a N-side contact electrode with ohmic contact for the silicon optical modulator.

Referring to FIG. 11 again, the method further includes a step of expanding the $P_+$ doping level into a first edge part of the rib structure from the first slab region and expanding the $N_+$ doping level into a second edge part of the rib structure from the second slab region. In an alternative way, this step includes a patterning and masking to define the first edge part of the rib structure to be a part that joins with the first slab region and to define the second edge part of the rib structure to be a part that joins with the second slab region. Then this step further includes doping the first edge part of the rib structure into the same intermediate $P_+$ doping level and doping the second edge part of the rib structure into the same intermediate $N_+$ doping level. Optionally, the first edge part in $P_+$ doping level is separated by a reduced portion of the rib structure with a gap width from the second edge part in $N_+$ doping level. Optionally, the step of patterning and masking to define the first edge part of the rib structure may be a same step of patterning and masking to define the first slab region. Optionally, the step of patterning and masking to define the second edge part of the rib structure may be a same step of patterning and masking to define the second slab region.

Referring to FIG. 11 again, the method furthermore includes a step of forming a PN junction in a reduced portion of the rib structure between the first edge part and the second edge part with moderate P/N doping level below the intermediate $P_+/N_+$ level. The PN junction is formed via a patterned ion-implantation process which allows precisely defining a P-type part of the reduced portion in the rib structure next to the first edge part in $P_+$ doping level and defining a N-type part of the reduced portion in the rib structure next to the second edge part in $N_+$ doping level. The P-type part interfaces with the N-type part. A sum of the widths of the P-type part and the N-type part equals to the gap width of the reduced portion in the rib structure. Optionally, the doping level of the P-type part or the N-type part is a moderate level of $1 \times 10^{17}$ cm$^{-3}$. Optionally, the length, the doping level, and offset distance of the P-type part and N-type part may or may be in symmetric or asymmetric form relative to the PN junction plane. Optionally, the gap width between the first edge part of rib structure in $P_+$ doping level and the second edge part of rib structure in $N_+$ doping level can be optimized together with the $P_+/N_+$ doping levels in symmetric or asymmetric form relative to the rib structure. Adding intermediate $P_+$ and $N_+$ inside the rib structure of the waveguide can improve the modulation efficiency significantly compared with conventional modulator having only the lower moderate doped P or N regions inside the rib structure. Optionally, the gap width can be reduced to zero to make a PN junction with a $P_+$ doped region directly interfacing a $N_+$ doped region. The $P_+$ doped region includes part of the rib structure plus the first slab region and the $N_+$ doped region includes remaining part of the rib structure plus the second slab region. The gap width between the $P_+$ region and $N_+$ region, and the offset distance from the P-N interface plane of the waveguide can be selected in such a way to optimize modulation efficiency while does not impact much on the bandwidth and optical loss. Optionally, the total length from the first slab region to the second slab region can be reduced with modulation efficiency improvement to form more compact sized silicon modulator with compensation on modulator bandwidth.

Figure 12:
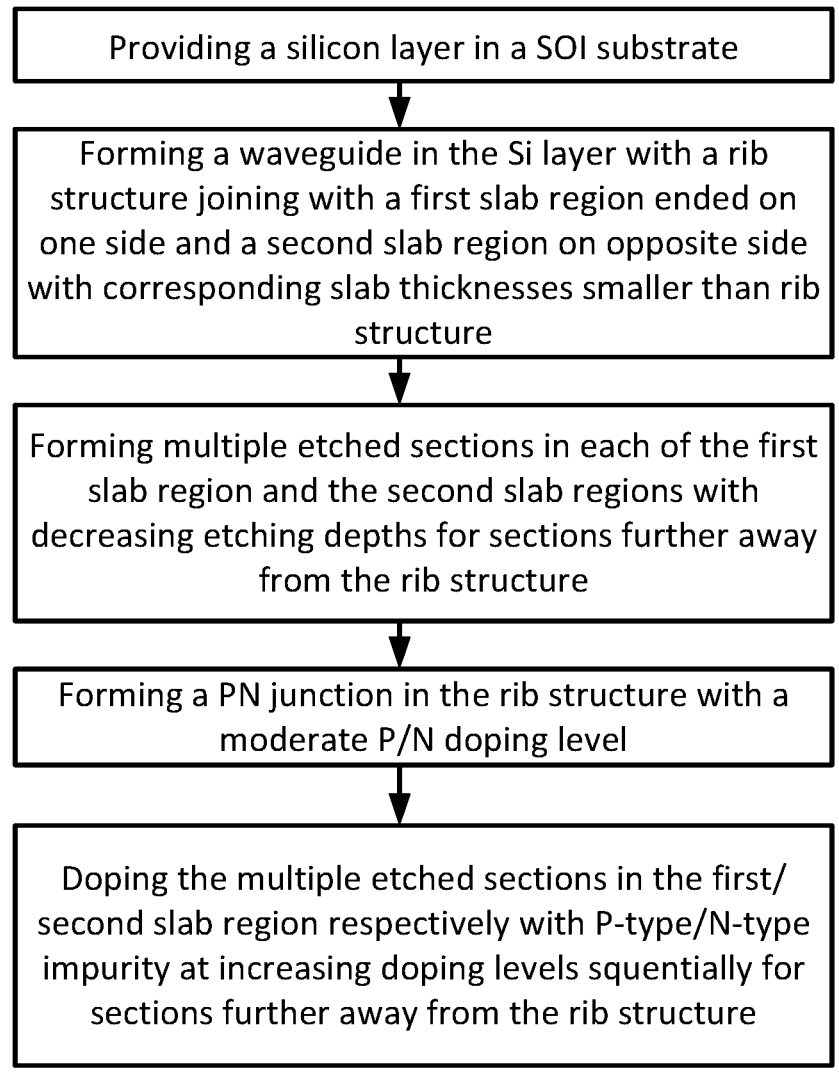
FIG. 12 is a flow chart of a method for improving modulation efficiency of a silicon optical modulator according to another embodiment of the present disclosure.

In another embodiment, the present disclosure provides a method for forming a silicon optical modulator with improved modulation efficiency. FIG. 12 shows a flow chart of the method according to an embodiment of the present disclosure. This diagram is merely an example, which should not unduly limit the scope of the claims. One of ordinary skill in the art would recognize many variations, alternatives, and modifications. Referring to FIG. 12, the method includes a step of providing a silicon layer in a silicon-on-insulator (SOI) substrate. SOI substrate is widely used in manufacturing of silicon photonics devices including modulator, combiner, wavelength locker, wavelength tuner, etc. Both MZ modulator and ring modulator can be fabricated based on the silicon layer on SOI substrate.

Referring to FIG. 12, the method also includes a step of forming a waveguide in the silicon layer with a rib structure in cross-section joined with a first slab region on one side and a second slab region on opposite side. Optionally, the rib structure has a flat top with a length in the cross-section ended with a first edge joining the first slab region and a second edge joining the second slab region. Optionally, the rib structure with the finite slab length between two slab regions, each with a nominal thickness smaller than the rib structure, provides an optical confinement effect for light waves traveling through it, making less and less optical power in the slab region as it is further away from the first/second edge. Optionally, the first slab region and the second slab region may be in symmetric or asymmetric form in its nominal slab thickness or slab length relative to the rib structure.

Referring to FIG. 12, the method additionally includes a step of forming multiple etched (multi-etched) sections in each of the first slab region and the second slab region. Optionally, this step is configured to perform a patterned etching process to each predefined section in each slab region with respective section lengths at respective distances away from a corresponding edge of the rib structure. In a specific embodiment, the etching process at each section is characterized by an etching depth and the step of forming the multi-etched sections includes forming respective sections with decreasing etching depths or increasing section thicknesses for sections with distances further away from the corresponding edge of the rib structure. For example, the first section in a slab region that has zero distance from the corresponding first edge of the rib structure has a largest etching depth. The second section next to the first section has a further distance away from the first edge and is characterized by a smaller etching depth or larger thickness than the first section. The third section also has a larger thickness than the second section, and so on. The last section in the slab has its section thickness equal to the nominal slab thickness. In the embodiment, that the multi-etched sections make the slab region thinner, especially the first section with the largest etching depth that is close to the rib structure, can substantially enhance electrical field confinement effect to the optical mode of the light wave passing through the waveguide in the rib structure. This confinement effect can significantly improve modulation efficiency of the silicon optical modulator. In other words, when the modulator is applied by a same bias voltage, it can drive much bigger phase change to the light signal therein. Additionally, increasing the slab thickness moving further away from the waveguide edge provides a benefit in compensation for series resistance which help to forming a modulator with optimized bandwidth.

Referring to FIG. 12 again, the method further includes a step of forming a PN junction in the rib structure with a moderate P/N doping level. This step forms a P-type part interfaced with a N-type port in the rib structure. This step is just to set the basis for the free carrier effect or plasma dispersion effect in the rib waveguide. When an applied voltage across the PN junction varies the carrier density also varies which changes the light absorption and refractive index. The changes in the refractive index is directly translated to phase and intensity modulation of the light signal. Optionally, the PN junction has a width (dimension of the P-type part+the N-type part) is set to be smaller than rib width of the rib structure.

Referring to FIG. 12, the method furthermore includes a step of doping the multiple etched sections in the first/second slab region with P-type/N-type impurity at increasing doping levels respectively for sections further away from the rib structure. For the multiple etched sections in the first slab region, this step includes a patterned implanting process to implant with increasing dosage of P-type ionic impurity into the corresponding sections sequentially with distances further away from the first edge of or near the P-type part of the rib structure. In an example, the first section, the second section, . . . , last section in the first slab region can be respective doped with increasing $P<P_{+1}, <\ldots, <P_{+2}$ doping level. The first section is part of the P-type part of the rib structure. In another example, the first section, the second section, . . . , last section in the first slab region can be respective doped with increasing $P_{+1}<P_{+2}, <\ldots, <P_{+3}$ doping level. The first section in $P_{+1}>P$ doping level is not part of but joined with the P-type part of the rib structure. For the multiple etched sections in the second slab region, this step includes implanting with increasing dosage of N-type ionic impurity into the corresponding sections sequentially with distances further away from the second edge of or near the N-type part of the rib structure. In an example, the first section, the second section, . . . , last section in the second slab region can be respective doped with increasing $N<N_{+1}, <\ldots, <N_{+2}$ doping level. The first section is part of the N-type part of the rib structure. In another example, the first section, the second section, . . . , last section in the second slab region can be respective doped with increasing $N_{+1}<N_{+2}, <\ldots, <N_{+3}$ doping level. The first section in $N_{+1}>N$ doping level is not part of but joined with the N-type part of the rib structure. In the embodiment, adding different doping condition in various slab sections with different section thickness to further optimize the series resistance. Due to the better optical confinement that mostly limits the optical mode in the rib waveguide, increasing slab section thickness would not add noticeable excess optical loss.

For each of the first slab region and the second slab region, multiple sections with different lengths and different distances away from the rib structure are defined according to a certain optimized configuration to achieve improved modulator performance. Optionally, the etching depth, section length, distance from the first edge of rib structure, and doping level of respective section in the first slab region may not be formed in symmetric way as the etching depth, section length, distance from the second edge of the rib structure, and doping level of respective section in the second slab region. For example, the etching depth of a section in the first slab region decreases as the distance of the section is further away from the rib structure based on a first optimized configuration. The etching depth of a section in the second slab region decreases as the distance of the section is further away from the rib structure based on a second optimized configuration. Optionally, a first patterned implanting process is performed to make the multiple etched sections in the first slab region with precise dosages increased from the first section to the last section in a first optimized configuration. Each section in the first slab region is doped in P-type with different doping level based on the first optimized configuration. Optionally, a second patterned implanting process is performed to make the multiple etched sections in the second slab region with precise dosages increased from the first section to the last section in a second optimized configuration. Each section in the second slab region is doped in N-type with different doping level based on the second optimized configuration.

Optionally, the method further includes a step of forming a first end region with heavily doped $P_{++}$ impurity joined with the last section of the first region and forming a second end region with heavily doped $N_{++}$ impurity joined with the last section of the second region. Optionally, the method furthermore includes a step of forming a first electrode with an ohmic contact with the first end region in heavy $P_{++}$ doping level and forming a second electrode with an ohmic contact with the second end region in heavy $N_{++}$ doping level.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An optical modulator comprising:
   a substrate;
   a first P region having a first p type doping level and a first N region having a first n type doping level forming a PN junction disposed in the substrate, each of the first P region and the first N region being L-shaped and including a first portion having a first cross-sectional dimension, and a second portion extending perpendicularly to the first portion and having a greater height than the first portion, the second portions being adjacent to each other, and the first portions being collinear and extending in opposite directions parallel to the substrate, wherein the second portion of the first P region further comprises an additional P region having a p type doping level less than the first p type doping level, and wherein the second portion of the first N region further comprises an additional N region having an n type doping level less than the first n type doping level;
   two or more additional P regions disposed in the substrate, one of the two or more additional P regions abutting the first portion of the first P region, the two or more additional P regions having respective p type doping levels that are different from the first p type doping level of the first P region and having respective cross-sectional dimensions that are different from the first cross-sectional dimension of the first portion of the first P region; and
   two or more additional N regions disposed in the substrate, one of the two or more additional N regions abutting the first portion of the first N region, the two or more additional N regions having respective n type doping levels that are different from the first n type doping level of the first N region and having respective cross-sectional dimensions that are different from the first cross-sectional dimension of the first portion of the first N region.

2. The optical modulator of claim 1 wherein:
   the respective p type doping levels of the two or more additional P regions are greater than the first p type doping level of the first P region;
   the respective cross-sectional dimensions of the two or more additional P regions are greater than the first cross-sectional dimension of the first portion of the first P region;
   the respective n type doping levels of the two or more additional N regions are greater than the first n type doping level of the first N region; and
   the respective cross-sectional dimensions of the two or more additional N regions are greater than the first cross-sectional dimension of the first portion of the first N region.

3. The optical modulator of claim 2 further comprising:
   a second P region disposed in the substrate, wherein the two or more additional P regions lie between the second P region and the first portion of the first P region, the second P region having a second p type doping level that is greater than the respective p type doping levels of the two or more additional P regions; and
   a second N region disposed in the substrate, wherein the two or more additional N regions lie between the second N region and the first portion of the first N region, the second N region having a second n type doping level that is greater than the respective n type doping levels of the two or more additional N regions.

4. The optical modulator of claim 3 wherein the respective p type doping levels and the respective cross-sectional dimensions of the two or more additional P regions increase from the first portion of the first P region to the second P region and wherein the respective n type doping levels and the respective cross-sectional dimensions of the two or more additional N regions increase from the first portion of the first N region to the second N region.

5. The optical modulator of claim 3 wherein respective electrical resistances of the two or more additional P regions decrease from the first P region to the second P region and wherein respective electrical resistances of the two or more additional N regions decrease from the first N region to the second N region.

6. The optical modulator of claim 3 wherein the cross-sectional dimension of one of the two or more additional the P regions abutting the second P region is equal to a cross-sectional dimension of the second P region, and wherein the cross-sectional dimension of one of the two or more additional the N regions abutting the second N region is equal to a cross-sectional dimension of the second N region.

7. The optical modulator of claim 3 wherein respective lengths of the two or more additional P regions decrease from the first P region to the second P region and wherein respective lengths of the two or more additional N regions decrease from the first N region to the second N region.

8. The optical modulator of claim 1 wherein each of the two or more additional P regions is of a different length than a corresponding one of the two or more additional N regions.

9. The optical modulator of claim 1 wherein each of the two or more additional P regions is of the same length than as a corresponding one of the two or more additional N regions.

10. The optical modulator of claim 3 wherein the PN junction is centered between the second P region and the second N region.

11. The optical modulator of claim 3 wherein the PN junction is closer to one of the second P region and the second N region.

* * * * *